United States Patent [19]

Lichtenstein

[11] 4,167,149

[45] Sep. 11, 1979

[54] PNEUMATIC VALVE WITH ACOUSTIC ALARM FOR A RECIPIENT UNDER PRESSURE

[76] Inventor: Bruno Lichtenstein, Rua Visconde do Herval, 967, Port Alegre, 90.000-RS-Brazil

[21] Appl. No.: 840,221

[22] Filed: Oct. 7, 1977

[30] Foreign Application Priority Data

Oct. 27, 1976 [BR] Brazil .................................. 7607223

[51] Int. Cl.² ............................................ B60C 23/04
[52] U.S. Cl. ...................................... 116/34 R; 116/70
[58] Field of Search ................. 116/70, 34 R, 114 PV; 340/58; 73/146.8

[56] References Cited

U.S. PATENT DOCUMENTS

| 1,061,184 | 5/1913 | Knies | 116/34 R |
| 1,281,274 | 10/1918 | Berry | 116/34 R |
| 1,368,927 | 2/1921 | Harris | 116/34 R |
| 1,455,145 | 5/1923 | Nelson | 116/34 R |
| 2,213,781 | 9/1940 | Hoschek | 116/34 R |
| 2,639,685 | 5/1953 | Benz | 116/34 R |
| 3,605,679 | 9/1971 | Voland | 116/34 R |

FOREIGN PATENT DOCUMENTS

| 10053 | of 1913 | United Kingdom | 116/34 R |
| 228192 | 7/1925 | United Kingdom | 116/34 R |
| 236939 | 8/1925 | United Kingdom | 116/34 R |

Primary Examiner—S. Clement Swisher
Assistant Examiner—Denis E. Corr
Attorney, Agent, or Firm—Michael J. Striker

[57] ABSTRACT

An acoustic alarm arrangement associatable with a pneumatic tire for generating a signal indicating that pressure of gas in the tire decreases from a predetermined magnitude, has a housing arranged to be connected with a tire and bounding an inner chamber, a signal element associated with the housing and actuated under the action of a strike, and a striking element movable in the inner chamber between an inoperative position in which it is spaced from the signal element and an operative position in which it approaches and strikes the latter. The striking element subdivides the inner chamber into a first compartment communicating with the interior of the tire, and a second compartment. A valve is located in an inner passage of the striking element and movable to a closed position in which it closes the inner passage of the striking element and disconnects the compartments from one another whereby gas at a predetermined pressure from the interior of the tire is admitted into the second compartment and counteracts the force of a spring and retains the striking element in the inoperative position and to an open position in which the inner passage is open and gas under decreased pressure flows from the interior of the tire into the second compartment, and opened further into the first compartment whereby gas pressures in the compartments become substantially equalized and the spring moves the striking element to the operative position.

4 Claims, 3 Drawing Figures

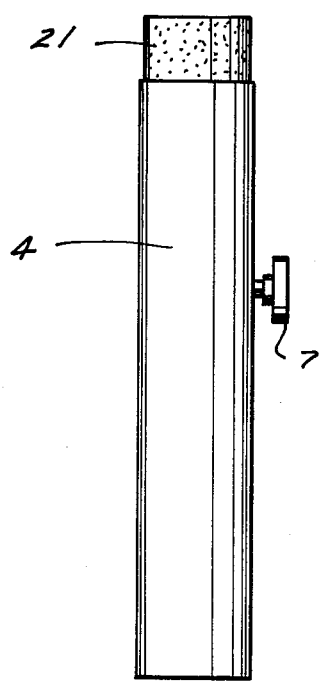
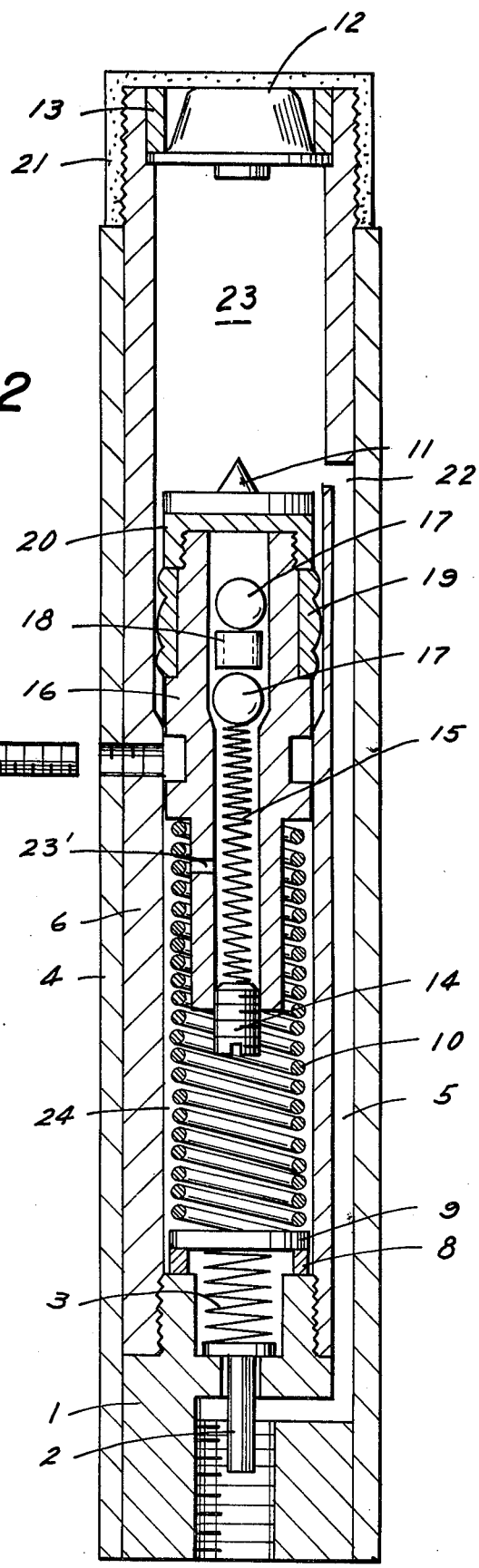
FIG. 2
FIG. 1

PNEUMATIC VALVE WITH ACOUSTIC ALARM FOR A RECIPIENT UNDER PRESSURE

BACKGROUND OF THE INVENTION

The present invention relates to an acoustic alarm arrangement associatable with a pneumatic tire for generating a signal indicating that pressure of gas in the tire decreases from a predetermined magnitude.

Acoustic alarm arrangements have been proposed in the art. It has been recognized that the known acoustic alarm arrangements possess some disadvantages and are not satisfactory in some cases.

SUMMARY OF THE INVENTION

Accordingly, it is an object of the present invention to provide an acoustic alarm arrangement associatable with a pneumatic tire for generating a signal indicating that pressure of gas in the tire decreases from a predetermined magnitude, which arrangement has some advantages as compared with the known arrangements.

In keeping with these objects, and with others which will become apparent hereinafter, one feature of the present invention resides, briefly stated, in an arrangement which has a housing arranged to be connected with a tire and bounding an inner chamber, a signal element associated with the housing and actuated under the action of strike, and actuating means operative to strike the signal element in response to a decrease of pressure in the tire. The actuating means includes a striking element movable in the inner chamber between an inoperative position in which it is spaced from the signal element and an operative position in which it approaches and strikes the latter. The striking element subdivides the inner chamber into a first compartment located between the striking element and the signal element and communicating with the interior of the tire, and a second compartment located at an opposite side of the striking element. The striking element has an inner passage extending between the compartments. The actuating means further includes a spring located in the second compartment and arranged for urging the striking element to the operative position. The actuating means also includes valve means located in the inner passage of the striking element and is movable to a closed position when gas at the predetermined pressure flows from the interior of the tire into the second compartment in which closed position the valve means closes the inner passage of the striking element and disconnects the compartments from one another whereby the gas admitted into the second compartment counteracts the force of the spring and retains the striking element in the inoperative position. The valve means also is movable to an open position when gas under decreased pressure flows from the interior of the tire into the second compartment in which open position the inner passage is opened and the compartments communicate with one another so that gas flows farther from the second compartment into the first compartment whereby gas pressures in the compartments become substantially equalized and the spring moves the striking element to the operative position.

BRIEF DESCRIPTION OF THE DRAWING

FIG. 1 is a view showing an acoustic alarm arrangement in accordance with the present invention;

FIG. 2 is a view showing an axial section of the arrangement in an inoperative position.

DESCRIPTION OF A PREFERRED EMBODIMENT

Figure 3:
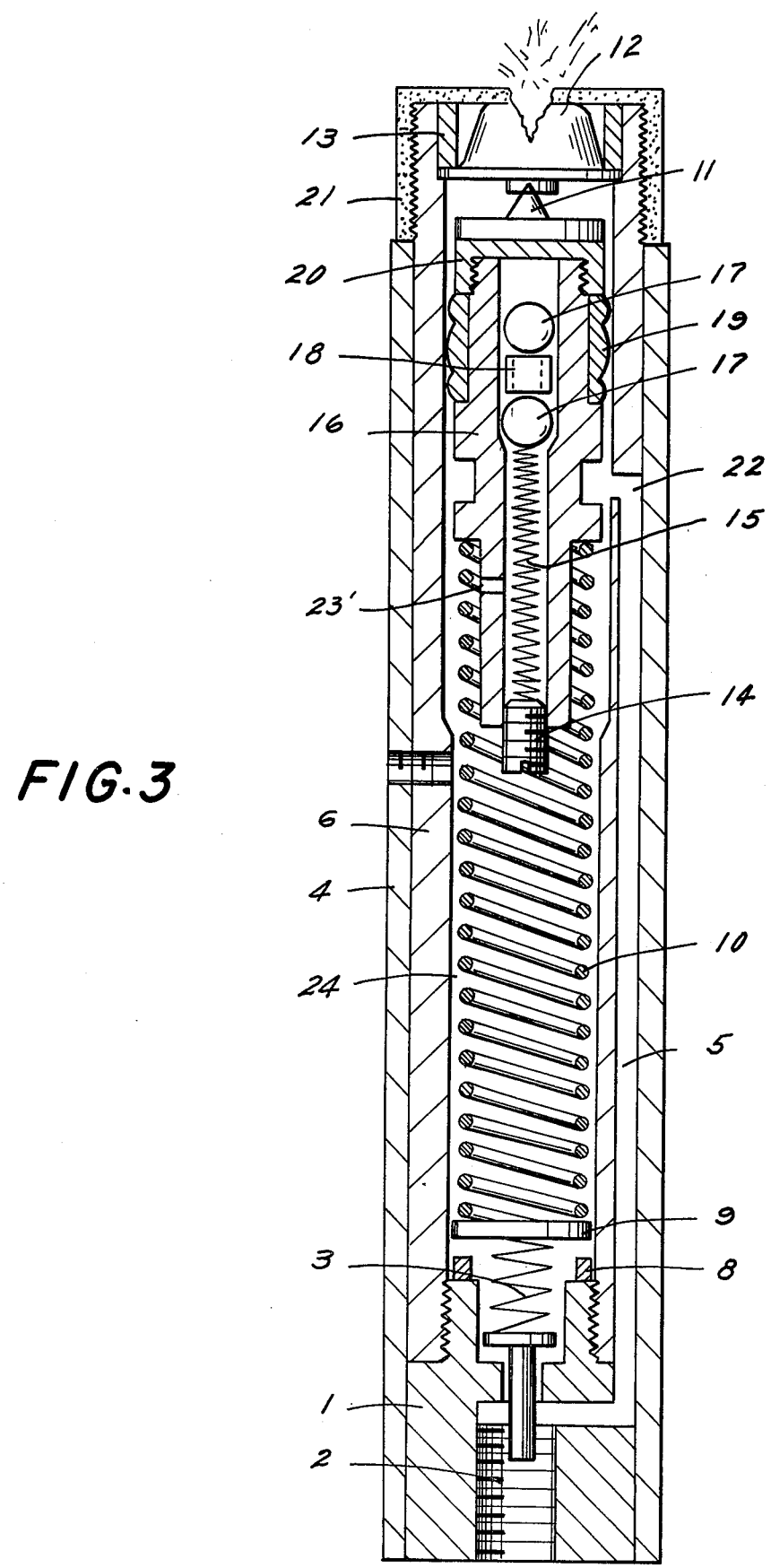
FIG. 3 is a view showing the axial section of the arrangement in an operative position.

A part (1) is screwed into a vent of the tire, causing the pin (2) to push a plug inwards. Gas from an inner tube of the tire flows from part (1) into the interior of a part (6) through (22). Gas urges a piston (16) so that the latter presses a detonating spring (10) inasmuch as the surface of the piston (16) is far greater than the force of the spring.

When the tire's pressure falls below the predetermined magnitude regulated by a spring (15) and its regulating screw (14), the pressure applied to spheres (17) reduces and the spheres (17) together with a piston (18) move from a sphere seat. Thereby gas flows from a zone (23) into a zone (24) through an orifice (23), thus equalizing the pressure on both sides of the piston (16) a detonating spring (10) pushes a detonator (11), which will cause explosion of a cap (12) and breaking of a lid (21). The driver will hear the explosion and will be able to change the tire before its low pressure can cause any damage to the tire or endanger the user.

By putting in a new cap and lid, pushing the propelling spring downwards, and placing in a safety-screw (7), the arrangement becomes ready to be used.

What is claimed is:

1. An acoustic alarm arrangement associatable with a pneumatic tire for generating a signal indicating that pressure of gas in the tire decreases from a predetermined magnitude, comprising a housing arranged to be connected with a tire and bounding an inner chamber; a signal element associated with said housing and actuated under the action of a strike; and actuating means operative to strike said signal element in response to a decrease of pressure in the tire, said actuating means including a striking element movable in said inner chamber between an inoperative position in which it is spaced from said signal element and an operative position in which it approaches and strikes the latter, said striking element subdividing said inner chamber into a first compartment located between said striking element and said signal element and communicating with the interior of the tire and a second compartment located at an opposite side of said striking element, said striking element having an inner passage extending between said compartments, said actuating means including a spring located in said second compartment and arranged for urging said striking element to said operative position, said actuating means further including valve means located in said inner passage of said striking element and movable to a closed position when gas at the predetermined pressure flows from the interior of the tire into said second compartment in which closed position said valve means closes said inner passage of said striking element and disconnects said compartments from one another whereby the gas admitted into said one compartment counteracts the force of said spring and retains said striking element in said inoperative position, and said valve means also being movable to an open position when gas under decreased pressure flows from the interior of the tire into said second compartment in which open position said inner passage is opened and said compartments communicate with one another so that gas flows further from said second compartment into said first compartment whereby gas pressures in said compartments become substantially equalized and said spring moves said striking element to said operative position.

2. An arrangement as defined in claim 1, wherein said valve means includes a valve seat formed in said inner passage of said striking element, a valve body movable in said inner passage of said striking element between one position in which it is in contact with said seat to thereby close said inner passage, and another position in which it is spaced from said seat so as to open said inner passage, and a further spring arranged for urging said valve body to said other position.

3. An arrangement as defined in claim 2, wherein said striking element has a peripheral surface and said housing has an inner surface; and further comprising a sealing element arranged between said peripheral surface of said striking element and said inner surface of said housing, said sealing element being urged into sealing engagement with said inner surface of said housing under the action of gas admitted from said second compartment of said housing into said inner passage of said striking element.

4. An arrangement as defined in claim 3, wherein said peripheral surface of said striking element is provided with a recess, said sealing element being located in said recess, said recess communicating with said inner passage of said striking element so that gas flows from said inner passage into said recess to thereby urge said sealing element into sealing engagement with said inner surface of said housing.

* * * * *